US012161953B2

(12) United States Patent
Zhu et al.

(10) Patent No.: US 12,161,953 B2
(45) Date of Patent: *Dec. 10, 2024

(54) CONTAINER-TYPE APPARATUS WITH A SUSPENDED PARTICLE SYSTEM FOR WASTEWATER TREATMENT

(71) Applicant: Wesdon-Tienda Environmental Sciences Co. Ltd., Tianjin (CN)

(72) Inventors: Jingxu Zhu, London (CA); Haibin Li, Guangzhou (CN); Yuanyuan Shao, London (CA); Xiaobo Wang, Guangzhou (CN); Anqi Liu, Guangzhou (CN); Zengli Zhao, Guangzhou (CN); George Nakhla, Woodbridge (CA); Ming Li, Beijing (CN)

(73) Assignee: WESDON-TIENDA ENVIRONMENTAL SCIENCES CO. LTD., Tianjin (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/810,927

(22) Filed: Mar. 6, 2020

(65) Prior Publication Data

US 2020/0330902 A1    Oct. 22, 2020

Related U.S. Application Data

(63) Continuation of application No. 15/940,773, filed on Mar. 29, 2018, now abandoned.

(30) Foreign Application Priority Data

Mar. 29, 2017 (CN) .......................... 201710197463.5
Mar. 29, 2017 (CN) .......................... 201710199430.4

(51) Int. Cl.
*B01D 21/00* (2006.01)
*B01D 21/02* (2006.01)
(Continued)

(52) U.S. Cl.
CPC ..... *B01D 21/0003* (2013.01); *B01D 21/0045* (2013.01); *B01D 21/0057* (2013.01);
(Continued)

(58) Field of Classification Search
CPC ............ B01D 21/0003; B01D 21/0057; B01D 21/10; B01D 2221/08; C02F 3/085;
(Continued)

(56) References Cited

U.S. PATENT DOCUMENTS 5,486,291 A * 1/1996 Todd ....................... C02F 3/085
                                                   210/602
7,736,513 B2 * 6/2010 Zhu ......................... C02F 3/302
                                                   210/605

(Continued)

FOREIGN PATENT DOCUMENTS

CN       102730819 A  * 10/2012

*Primary Examiner* — Claire A Norris
(74) *Attorney, Agent, or Firm* — HILL & SCHUMACHER

(57) ABSTRACT

A container-type apparatus for wastewater treatment with a suspended particle system, including one or multiple biological reaction zones. The biological reaction zones can be facultative, anaerobic, anoxic, and aerobic and at least one of the biological reaction zones is a suspended particle system. Particles in the suspended particle system act as the carrier of microbiota and offer better conditions for them to grow. The apparatus adopts a box structure, such as a container type, which is convenient to move, flexible to assemble, and can be used multiple times. Based on actual requirements, this apparatus can also be a structure type. The suspended particle system can increase the concentration of
(Continued)

microorganisms significantly, improve the ability to bear impact load, produce less sludge, and without sludge expansion.

26 Claims, 3 Drawing Sheets

(51) Int. Cl.
 C02F 1/58 (2023.01)
 C02F 1/70 (2023.01)
 C02F 3/00 (2023.01)
 C02F 3/08 (2023.01)
 C02F 3/12 (2023.01)
 C02F 3/18 (2023.01)
 C02F 3/30 (2023.01)

(52) U.S. Cl.
 CPC .............. *B01D 21/10* (2013.01); *C02F 1/586* (2013.01); *C02F 1/70* (2013.01); *C02F 3/085* (2013.01); *C02F 3/121* (2013.01); *C02F 3/18* (2013.01); *C02F 3/301* (2013.01); *B01D 2221/02* (2013.01); *B01D 2221/08* (2013.01); *C02F 3/006* (2013.01); *C02F 3/1242* (2013.01); *C02F 2203/006* (2013.01); *C02F 2203/008* (2013.01); *C02F 2209/06* (2013.01); *C02F 2209/22* (2013.01); *Y02W 10/10* (2015.05)

(58) Field of Classification Search
 CPC ............ C02F 3/121; C02F 3/18; C02F 3/301; C02F 3/1242; C02F 1/586; C02F 2203/006; C02F 2203/008; Y02W 10/10
 USPC ....... 210/605, 150, 630, 615, 747.5, 170.01, 210/170.02, 170.09
 See application file for complete search history.

(56) References Cited

U.S. PATENT DOCUMENTS 8,372,274 B2 * 2/2013 Early .................... C02F 3/06
 210/86
8,551,341 B2 * 10/2013 Conner .................. B01F 5/10
 210/739

* cited by examiner

CONTAINER-TYPE APPARATUS WITH A SUSPENDED PARTICLE SYSTEM FOR WASTEWATER TREATMENT

FIELD

The present invention relates to a container-type apparatus for wastewater treatment with a suspended particle system for the application in wastewater treatment. Meanwhile, it can be applied to other fields as a high-efficiency liquid-solid and gas-liquid-solid contact or reaction system.

BACKGROUND

According to the quality monitoring results of surface water and underground water in 2015, the overall water quality is in a serious situation. With the population growth and economic development, the demand for water increases and so as the discharge of wastewater, leading to the shortage of water resources. Currently, more and more companies start to utilize green technologies to improve water quality by reducing waste production. However, the effects are not very obvious. In order to achieve the sustainable development of water resources, it is obliged to treat wastewater and turn it into usable water. Therefore, wastewater treatment technologies are very important. Especially, due to the lack of onsite wastewater treatment technologies in the present, wastewater cannot be treated effectively and in time. The consequence is severer water pollution and gradual deteriorating of water quality.

Wastewater mainly consists of domestic wastewater, industrial wastewater, livestock farm wastewater, agricultural wastewater, etc. The major indicators of wastewater include chemical oxygen demand (COD), biochemical oxygen demand (BOD), ammonia nitrogen, and total phosphorus. Wastewater contains a variety of nutrients facilitating the growth of aquatic plants, pathogenic microorganisms which may cause diseases, and toxic chemical compounds that can be carcinogenic or mutagenic. Therefore, from the perspective of protecting human health and the environment, wastewater must be treated before reuse or discharge. A variety of methods for wastewater treatment can be divided into four categories in terms of mechanisms: physical treatment, chemical treatment, physicochemical treatment, and biological treatment. These methods can be applied together when treating wastewater, wherein the biological treatment is the most economical, effective and widely-used method. Currently, in most traditional wastewater treatment plants, biological wastewater treatment technology adopts activated sludge methods, such as oxidation ditch activated sludge method, A-B activated sludge method, SBR sequencing batch activated sludge method, feeding activated sludge method, etc.

Although the treatment results are able to meet the requirements of "Pollutant Emission Standards of Urban Wastewater Treatment Plants" (GB18918-2002), these methods have low organic load, low microbial concentration, weak ability of bearing impact load, high excess sludge yield, easy occurrence of sludge expansion, leading to low treatment efficiency, high energy consumption, and large amount of excess sludge. Consequently, the apparatus requires a large volume and takes up a lot of space. Thus, a more efficient and energy-saving wastewater treatment technology is needed. Meanwhile, some regions with a low population density are not appropriate to construct large-scale pipe networks or wastewater treatment plants and some small sites only require temporary treatment. In these places, traditional wastewater treatment apparatus cannot be used, so small portable wastewater treatment apparatus with low construction and operation costs is necessary. Overall, the current needs are a high-efficiency and energy-saving wastewater treatment technology as well as a small portable wastewater treatment apparatus.

SUMMARY

It is the object of the present invention to provide a container-type apparatus for wastewater treatment with a suspended particle system.

To attain the above objective, the present invention is realized by means of the following technical solution.

A container-type apparatus for wastewater treatment with a suspended particle system, comprising one or more biological reaction zones. Said biological reaction zones include any one of the anaerobic zone, anoxic zone, and aerobic zone or their combination. At least one of said biological reaction zones is a suspended particle system. Said suspended particle system includes particles acting as the carrier of microbiota and the principle is to benefit the growth of microbiota.

The present invention contains a container-type apparatus for wastewater treatment with a suspended particle system. It has the following advantages: the apparatus adopts a box structure, such as a container type, which is convenient to move, flexible to assemble and can be used for multiple times. Based on actual requirement, this apparatus can also be constructed on-site. The suspended particle system in the present invention applied in wastewater treatment can increase the concentration of microorganisms significantly, improve the ability to bear impact load, produce little excess sludge, and avoiding sludge expansion. Meanwhile, the means to suspend particles by gas and liquid is able to reduce energy consumption. Therefore, this system features with high efficiency and low energy consumption.

The present disclosure provides a container-type apparatus for wastewater treatment with a suspended particle system. The system includes two or more interconnected facultative biological reaction zones with the two or more facultative biological reaction zones including any one or combination of at least one anaerobic zone, at least one of an anoxic zone and aerobic zone, and at least one of the facultative biological reaction zones including a suspended particle system comprised of any one or combination of light particles and heavy particles. The any one or combination of light particles and heavy particles having microorganisms located on surfaces thereof. A density of the light particles is lower than a density of the wastewater and a density of the heavy particles is higher than the density of the wastewater. The system includes a gas injection mechanism for injecting gas into enclosures containing the suspended particle system with the gas injection mechanism being located near the bottom of the enclosures to inject gas upwardly into the liquid phase containing the light and or heavy particles. By injecting gas from near the bottom light particles move downward while heavy particles move upward and such that both light and heavy particles are suspended in the liquid. The gas injection mechanism is configured so that the gas phase flows upwardly in the enclosures continuously or intermittently.

The density of said light particles is higher than or equal to 80% of the density of said liquid and lower than the density of said liquid.

The density of said heavy particles is higher than the density of said liquid and lower than or equal to 120% of the density of said liquid.

The biological reaction zones may include aerobic zones and at least one of the anaerobic zone or anoxic zone.

The aerobic zones and anaerobic and anoxic zones may be connected to the wastewater.

The container-type apparatus may include a container having several enclosures contained therein, the container including a wastewater input, the several enclosures contained within the container being interconnected so that wastewater flows into the container and into the several enclosures, the light and heavy particles contained in the several enclosures and each of the enclosures corresponding to a separate biological reaction zone.

The container-type apparatus may include a plurality of box structures each box structure having perforated walls to allow wastewater to enter an interior of each box structure, the light and heavy particles contained in each of the boxes, and wherein each box contains one biological reaction zones different than the reaction zones in the other boxes.

The container-type apparatus may include an inflow system, an effluent system, a gas intake system, and a sludge drainage system or their combination, and the gas intake system may be adapted to provide continuous or intermittent gas intake.

The container-type apparatus for wastewater treatment may include one or more biological reaction zones and settling zones. The liquid in one or multiple of said biological reaction zones is connected to the liquid in said settling zone.

The wastewater in said settling zone produces sludge after going through sludge settling and then the sludge is discharged via a sludge drainage system.

The biological reaction zone includes screen meshes for preventing the outflow of particles.

One or multiple container-type apparatuses may be arranged intensively in groups or separately in polluted rivers or lakes to treat polluted water.

One or multiple container-type apparatus may be arranged near one or more drain outlets along river bank for treating polluted water before discharging into river.

One or multiple container-type apparatus may be installed in a trailer for the onsite scattered point wastewater treatment.

One or multiple container-type apparatus may be arranged separately or in a group in a wastewater accumulating tank for receiving discharged wastewater from aquaculture ponds to treat the aquaculture wastewater and achieve water treatment and recycling of the treated water.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which.

DETAILED DESCRIPTION

Figure 1:
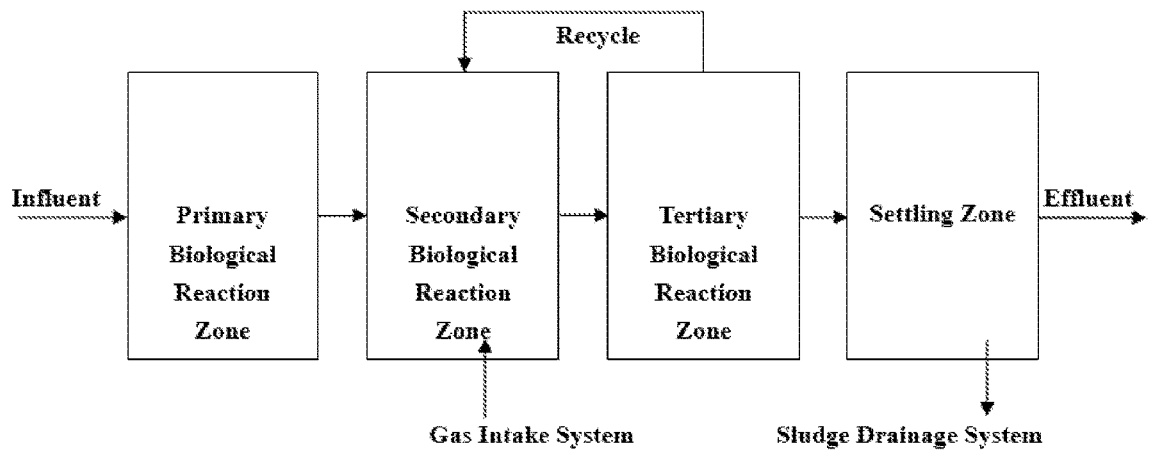
FIG. 1 is the schematic diagram of wastewater treatment apparatus in the present disclosure.

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the phrase "light particles" refers to particles having a density in a range which is higher than about 80% of the density of the liquid and lower than the liquid density.

As used herein, the phrase "heavy particles" refers to particles having a density in a range which is higher than the density of the liquid and lower than or equal to 150% of the density of the liquid. Preferably, the density of the heavy particles is between the density of the liquid and lower than or equal to 125% of the density of the liquid.

As used herein, the phrase "mixed particles" or "mixed particle system" refers to a mixture of both light and heavy particles in which the density of the light particles is higher than or equal to about 80% of the density of the liquid phase and lower than the density of the liquid phase, and the density of the heavy particles is higher than the density of the liquid phase and lower than or equal to about 150% of the density of the liquid phase.

As used herein, the term "microorganisms" refers to microscopic organisms which may exist in the wastewater and biological wastewater treatment systems. In particular, the microbial culture of the biological wastewater treatment system includes both heterotrophic and autotrophic bacteria of the types observed in conventional activated sludge processes. The heterotrophic bacteria is primarily responsible for the biodegradation of organics, denitrification, and phosphorous uptake etc. and include but are not limited to various *Pseudomonas, Clostridium, Bacillus*, and *Salmonella* species, *Actinomyces, Acinetobacter, Corynebacterium, Escherichia Coli, Klebisella, Staphylcocus, Streptococcus, Vibrio Cholerae*. The autotrophic bacteria, that utilizes inorganic carbon predominantly in the form of alkalinity, is primarily responsible for nitrification in the process and consists of bacteria such as *Nitrosomonas, Nitrobacter, Nitrosococus*, and *Nitrospira*. It must be asserted that the biofilms attached on the media usually comprise both heterotrophic and autotrophic bacteria."

To better understanding, the present invention will be illustrated using the following embodiments.

In an embodiment, the present invention disclosed a container-type apparatus for wastewater treatment with a suspended particle system, comprising one or more biological reaction zones. The biological reaction zones includes any one of facultative zones, anaerobic zones, anoxic zones and aerobic zones or their combination. At least one of the biological reaction zones is a suspended particle system. The suspended particle system includes particles as the carrier of microbiota and needs to benefit the growth of microbiota.

In this embodiment, the particles in this system have large specific surface areas. Applying this system in the process of wastewater treatment can increase the concentration of microorganisms significantly to improve the treatment efficiency. Microbiota are able to attach to the surface of suspended particles to form biofilms. Some microorganisms are heterotrophic bacteria and others are autotrophic bacteria so that the microbiota are formed by various types of microorganisms. Microorganisms grow and detach on the surface of suspended particle media and renew continuously. They trigger metabolic degradation reaction with organic pollutants, and/or nitrification and denitrification with ammonia, and/or phosphorus release and uptake reactions.

The suspended particle system has the following features: (1) relatively heavy organic volume load, short hydraulic retention time, small reactor volume and reduced footprints enabling the system especially suitable for such regions as suffering land shortage and high land price. (2) Great performance of mass transfer, especially when fluidization is driven by gas instead of by liquid, can increase the treatment efficiency. (3) The flow of gas, liquid and solid can promote the renewal of biofilm, ensuring that microorganisms with intense activity occupying the surface of particles and resulting in better treatment capability. (4) The suspension of particles by gas and liquid can reduce energy consumption. In conclusion, the suspended particle system in wastewater treatment can not only enhance the treatment efficiency but also save energy. The apparatuses used in biological reaction zones are box-type in order to maximize the space utilization. Also, several apparatuses can be assembled as the container-type for easy movement.

In the other embodiment, a container-type apparatus for wastewater treatment with a suspended particle system that is comprising one or more biological reaction zones and settling zones. And also the liquid in at least one of the biological reaction zones being connected to the liquid in the settling zone.

In the other embodiment, the suspended particles are light particles and the density of the light particles is higher than or equal to 80% of the density of the liquid and lower than the density of the liquid. Besides, the suspended particles are heavy particles and the density of the heavy particles is higher than the density of the liquid and lower than or equal to 120% of the density of the liquid. Additionally, the suspended particles are mixed particles and the mixed particles are the mixture of light and heavy particles.

Due to the existence of reactions, the "suspended particle system" in the biological reaction zones should not be interpreted as constant suspension. Instead, it should be understood that particles are suspended in the system by various methods and are moving freely. "Various methods" include the liquid method, gas method, or other methods (e.g. agitation), among which the combination of gas and liquid is preferred. The suspended particle system can be classified as light particle system, heavy particle system, and mixed particle system.

The density of light particles in the light particle suspension system is lower than the density of the liquid. The suspension of light particles can be realized by gas or/and liquid. The suspension of particles by gas: in the initial state, light particles float near the top of the liquid since the density of particles is lower than the liquid. In this situation, particles only contact with the upper part of the liquid. When gas is introduced from the bottom into the liquid, the gas-liquid mixture would be generated. Particles near the top of the liquid move downward and are eventually suspended in the gas-liquid mixture by changing the rate of gas inflow. The suspension of particles by liquid: liquid enters the system from the top and particles are suspended in the liquid due to the drag force applied by the liquid. The suspension of particles by the combination of gas and liquid: the operation combining two methods can save some energy in the case of reaching the same goal.

The density of heavy particles in the heavy particle suspension system is higher than the density of the liquid. The suspension of heavy particles can be realized by gas or/and liquid. The suspension of particles by gas: in the initial state, heavy particles settle near the bottom of the liquid since the density of particles is higher than the liquid. In this situation, particles only contact with the bottom part of the liquid. When gas is introduced from the bottom into the liquid, particles near the bottom of the liquid move upward due to the drag force applied by the gas and are eventually suspended in the gas-liquid mixture by changing the rate of gas inflow. The suspension of particles by liquid: liquid enters the system from the bottom and particles are suspended in the liquid due to the drag force applied by the liquid. The suspension of particles by the combination of gas and liquid: the operation combining two methods can save some energy in the case of reaching the same goal. The gas velocity and liquid velocity should be higher than the minimum fluidization velocity so as to achieve fluidization and lower than the terminal settling velocity to prevent particle loss due to particles entrainment.

Mixed particles in the mixed particle suspension system include light particles and heavy particles. The suspension of mixed particles can be realized by gas or/and liquid. The suspension of particles by gas: in the initial state when both light particles and heavy particles exist, light particles float near the top of the system while heavy particles settle near the bottom of the liquid. In this situation, particles only contact with the liquid near the top and bottom. Gas is then introduced from the bottom. When the first critical gas velocity is reached, light particles at the upper layer expand downward and stay suspended. When the second critical gas velocity is reached, heavy particles at the lower layer expand upward and stay suspended due to the drag force applied by the upward gas. As long as choosing the suitable operating gas velocity, that is larger than the first critical speed and the second critical speed and lower than the both terminal velocities of the light particle and the heavy particle, which may lead the mixed particles to expend from two ends of the system towards the center and occupy the entire system. Moreover, the first critical gas velocity and the second critical gas velocity are not distinguished by magnitude. The suspension of particles by the combined action of gas and liquid: the liquid can be added into the system continuously or intermittently from the top, bottom, or other parts of the system. Meanwhile, by injecting gas from the bottom and by the effect of gas and liquid, light particles move downward while heavy particles move upward and both of them are suspended in the liquid.

The size of the light particles or heavy particles is various. When choosing light particles or heavy particles considering the diameter, light particles or heavy particles with a diameter smaller than 10 mm are preferred. The first choice would be light particles or heavy particles with a diameter smaller than 5 mm. The greater is the particle diameter, the smaller is the specific surface area of particles, which affects the sufficient contact and mass transfer between the gas, liquid and solid. The material and shape of particles are various, such as hollow spherical polyethylene particles, not excluding other particles. The preferable choices are particles with large specific surface areas, a shape similar to sphere, a density close to the liquid, and great liquid contact ability. When applied to wastewater treatment, particles with surfaces suitable for the growth of microorganisms are preferred.

The "container-type apparatus" used in biological reaction zones and settling zones should be interpreted as an apparatus with a box-like shape or an arbitrary combination of multiple box-like apparatuses. The connection between the boxes can be a baffle, which saves material by removing a wall of one box. The material may be corrosion-resistant steels, concretes, or other materials (such as plastics). This box type apparatus can be arbitrarily assembled to meet different space requirements as well as piled up vertically and connected horizontally. Also, product apparatuses with different sizes can be processed in advance for quick assembling when needed. Alternatively, complete apparatuses are made to undertake on-site treatment and they are withdrawn afterward for use in other sites. Besides, irregular boxes may be designed to fit specific places so as to save space significantly, enhance space utilization, and save time, efforts and money. Installation can be inside buildings, on the ground, or buried under the ground with landscape built above it. If the wastewater quantity increases and the original treatment site still has space, more boxes can be added to achieve the goals.

As described above, biological reaction zones include any one of the anaerobic zone, anoxic zone, and aerobic zone or their combination. Thus, different pollutants can be treated in different environments. If it is possible to bond anaerobic, anoxic and aerobic environments, this apparatus is able to be applied to a combination of different environments.

Furthermore, the biological reaction zones include aerobic zones and at least one of the anaerobic zone or anoxic zone. Moreover, the aerobic zones are connected to the liquid of at least one of the anaerobic zone or anoxic zone.

The process of this apparatus used in wastewater treatment: wastewater enters biological reaction zones through the inflow system and receives the biological treatment. If necessary, gas can be introduced via the gas intake system. Then, the treated wastewater enters the settling zones for sedimentation. The sludge produced from sedimentation is discharged periodically through the sludge drainage system, while the clarified liquid flows out through the effluent system and eventually the effluent meeting the standards is obtained. To better remove the "three nitrogen" (i.e., nitrite nitrogen, nitrate nitrogen, and ammonia nitrogen), a portion of the wastewater entering the settling zones may be recycled to any one or more of the biological reaction zones for retreatment.

In another embodiment, this apparatus consists of an inflow system, an effluent system, a gas intake system, and a sludge drainage system. Hereinto, the inflow system may contain feed pumps, inflow troughs, etc. The inflow troughs with jagged edges are preferable, mainly for preventing large objects from entering the reaction zones and for the uniform distribution of liquid. The effluent system may contain effluent troughs, effluent channels, etc. The effluent troughs with jagged edges are preferable in order to reduce the amount of sludge entering the effluent. The preferential choice of effluent channels is the ones with multiple channels arranged on both sides and with baffles inside the channels. Consequently, channels can only discharge the effluent when fully submerged, preventing floating objects on the liquid surface from entering the effluent.

For example, the gas intake system may contain air blowers, aerators, etc. High-efficiency aerators, such as microporous aerators, are preferred to evenly distribute bubbles in the reaction zones, increase dissolved oxygen, and enhance particle fluidization. The gas intake method may be continuous or intermittent, therein the intermittent intake can be arranged to save energy by monitoring the dissolved oxygen in the water. Furthermore, the sludge drainage system may contain sludge guiding troughs, sludge storage troughs, sludge pumps, etc. Sludge guiding troughs are mainly for dredging the sludge into sludge storage troughs. Inclined sludge guiding troughs, including inclined planks and inclined troughs, are selected preferably so that the sludge flows into sludge storage troughs along sludge guiding troughs due to gravity. Sludge storage troughs are used to store the sludge from sludge guiding troughs for more convenient sludge discharge.

Furthermore, apart from the above components, screen meshes or other components to prevent particles leaking can be added to the effluent section of the biological reaction zones (e.g. liquid-solid separators can be installed in the effluent section). The main purpose is to minimize particles loss, but if the particles loss is severe, particles can be added to the biological reaction zones periodically. Moreover, sludge settling plates may be added to the settling zones to preserve the sludge in the settling zones after the sludge hits the settling plates in order to reduce the sludge content in the effluent. Sludge settling plates which can generate complex channels are preferred. The "may contain" stated above means that all of the contained components or part of them exist or none of them or not all of them exists. It is preferred that all of them exist.

In another embodiment, one or multiple the container-type apparatus for wastewater treatment is arranged intensively or separately in polluted rivers or lakes to treat polluted water.

In another embodiment, one or multiple the container-type apparatus for wastewater treatment is arranged near to one or more drain outlets along river bank for treating polluted water before discharging into river.

In another embodiment, the wastewater treatment apparatus are installed in a trailer. For some places that cannot access to drainage network, such as scattered towns, residential districts, hotels, tourist areas and mountain areas, the trailer can be used for onsite wastewater treatment. Because the container-type particle distribution system has such many advantages as small footprint, high efficiency, low energy consumption, few discharge of sludge and easy controlling, etc., it has a decent prospect to be applied for the treatment of wastewater from scattered points.

In another embodiment, one or multiple the container-type apparatus for wastewater treatment is set up intensively or separately in the accumulating tank where receiving discharged wastewater from aquaculture ponds to treat the aquaculture wastewater and achieve the water recycle.

Applications of the Present System

The application of the present system will be further described below in relation to wastewater treatment, but it may also be used in other applications, for example, effluent treatment from a host of industrial processes.

The present system disclosed herein will now be illustrated using the following non-limiting example.

EXAMPLE

In the other embodiment, as shown in FIG. 1, the wastewater treatment apparatus is composed of several biological reaction zones and settling zones, in which one or more biological reaction zones are suspended particle systems. Biological reaction zones contain an inflow system, a gas intake system, an effluent system, and a sludge drainage system, where internal circulation can be set up alternatively.

Figure 2:
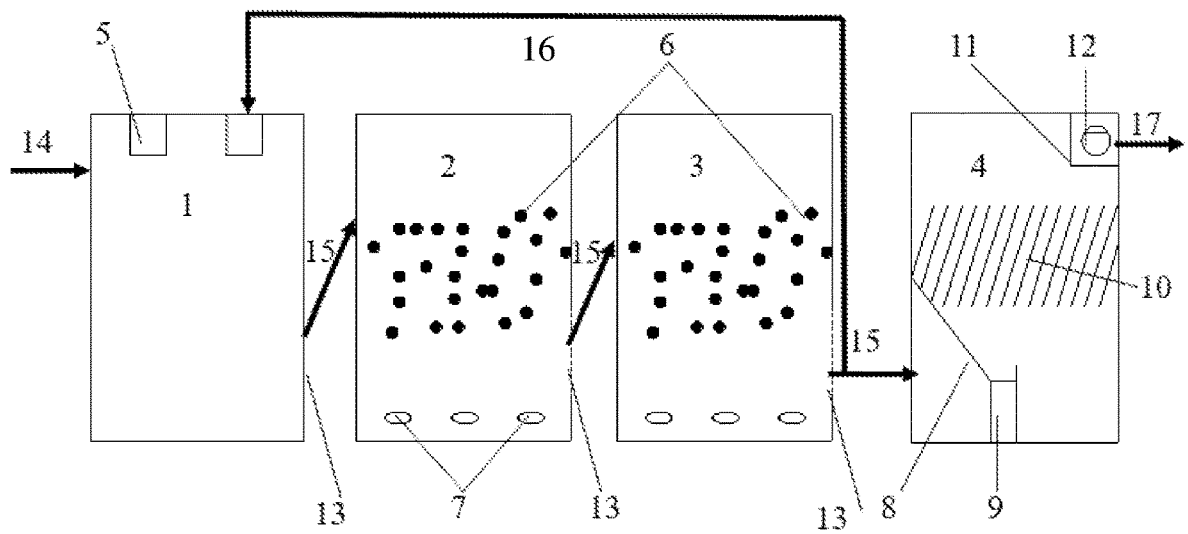
FIG. 2 is the schematic diagram of a container-type apparatus for wastewater treatment with a suspended particle system in the present disclosure. The meanings of the labels in FIG. 2 are: 1. Primary biological reaction zone; 2. Secondary biological reaction zone; 3. Tertiary biological reaction zone; 4. Settling zone; 5. Water inlet channel; 6. Particles; 7. Aeration device; 8. Sludge guiding trough; 9. Sludge storage trough; 10. Sludge settling plate; 11. Effluent trough; 12. Effluent cylinder; 13. Screen mesh; 14. Inlet water; 15. Treated effluent; 16. Recycling water; 17. Effluent.
Figure 3:
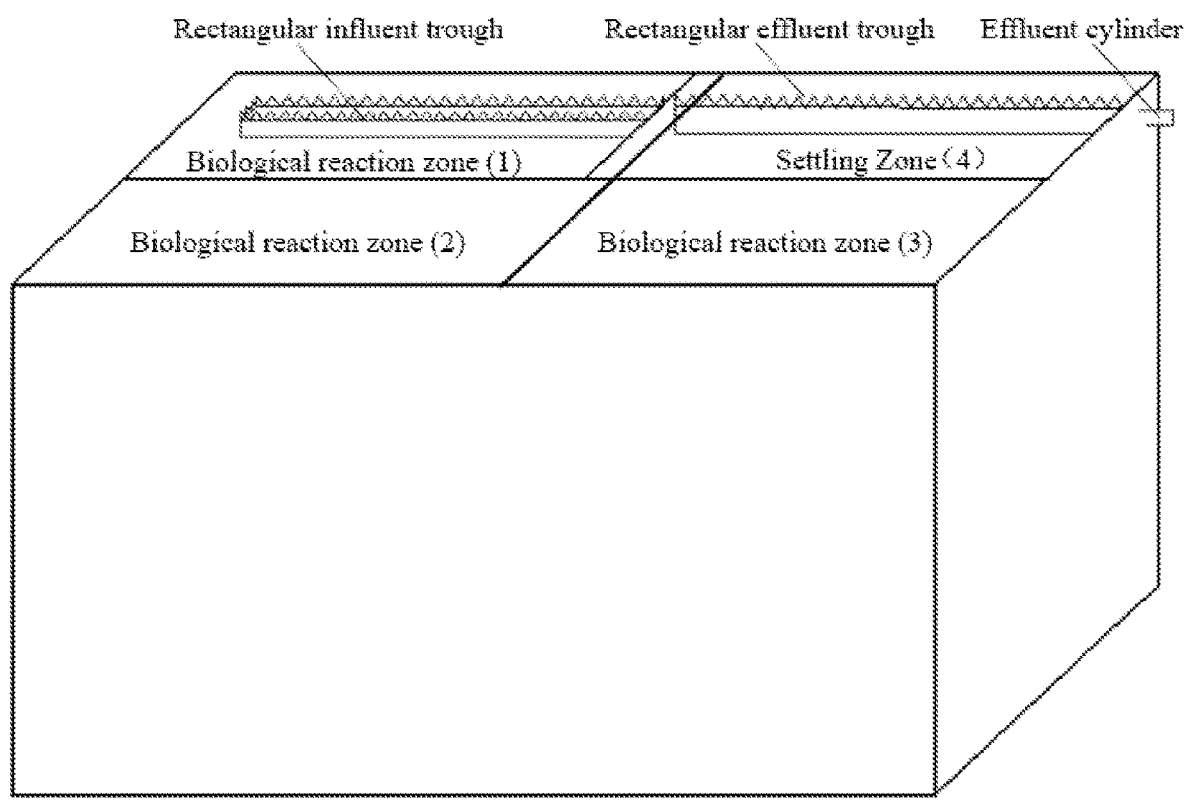
FIG. 3 is the schematic diagram of the combination of a container-type apparatus for wastewater treatment.

FIG. 2 presents the container-type apparatus for wastewater treatment with a suspended particle system in the present invention. Particles in the suspension system of this apparatus are light particles. FIG. 3 demonstrates this apparatus after assembling. The biological reaction zone (1) in FIG. 3 is the primary biological reaction zone in FIG. 2, which is not a suspended particle system and only has an inflow trough. The biological reaction zones (2) and (3) in FIG. 3 correspond to the secondary and tertiary reaction zones in FIG. 2, respectively, and both are suspended particle systems. The biological reaction zones (1) and (2) are partially connected, (2) and (3) are fully connected, the biological reaction zone (3) and settling zone (4) are partially connected, and (1) and (4) are totally not connected. Anaerobic reactions take place in the biological reaction zone (1) while biological reaction zones (2) and (3) offer anaerobic and aerobic environments by intermittent aeration. The entire apparatus is made of carbon steel plates and the internal baffle is a steel plate with a width of 0.01 m. The size of the apparatus is 6.1×2.1×2 m and its effective size is 6×2×1.8 m. The effective sizes of biological reaction zones (1), (2) and (3), and (4) are of 3×1×1.8 m, 6×1×1.8 m, and 3×1×1.8 m, respectively.

A baffle between (1) and (2) causes the treated wastewater to enter the biological reaction zone (2) from the top. The baffle between (3) and (4) with a length of 3 m and a width of 0.2 m has an exit with a screen mesh exist at its bottom. Zones (1) and (4) are completely separated by a baffle. The depth of the inflow trough is 10 cm, and the sludge guiding trough is composed of a 3×0.7×0.005 m inclined plate and a 5 cm-depth inclined trough. The size of the storage trough is 30×30×50 cm, the depth of the effluent trough is 45 cm, and the nominal diameter of the effluent cylinder is 30 cm. The selected particles are ellipsoidal polypropylene light particles with a density about 930 kg/m$^3$ and an equivalent diameter about 2.5 mm. Air serves as the gas and aerators are microporous leather tubes with a diameter of 10 cm and a ventilatory capacity of 5 m$^3$/(m·h). Multiple aerators are required to ensure the suspension of particles.

The culture method of microorganism in this apparatus is as follows: the fresh activated sludge is collected from septic tanks or other places and fed into this apparatus. Wastewater is pumped into the apparatus and microorganisms are cultivated using internal wastewater circulation. As a result, the adaptability of microorganisms to such wastewater is improved and better treatment results are obtained.

The online monitoring system is adopted in this apparatus. Apart from monitoring the flowrates of inflows and effluents in each section, dissolved oxygen in the water (e.g. by dissolved oxygen probes) and pH are monitored as well. The feedback control of the monitoring system is able to adjust the environments in biological reaction zones to meet the needs of microorganisms. For instance, by monitoring the dissolved oxygen in water using dissolved oxygen probes, the dissolved oxygen can be controlled to create anaerobic, anoxic and aerobic environments.

The process of the entire apparatus is shown in FIG. 2. Wastewater passes through the inflow trough 5 and enters the primary biological reaction zone (1). The treated wastewater flow into biological reaction zones (2) and (3) in sequence through the screen mesh (13). If needed, the effluent may enter other biological reaction zones and then flows into the settling zone (4) from the bottom of the tertiary biological reaction zone (3). After sedimentation through the sludge settling plate (10), the effluent flows into the effluent trough (11) from the top of the settling zone (4) and is discharged when the polyporous effluent cylinder (12) is full. The other portion of the effluent is recycled to the inflow trough (5), mixed with fresh wastewater, and then fed to the primary biological reaction zone (1). Gas enters the secondary and tertiary biological reaction zones via the aerator (7). The sludge undertakes sedimentation through the sludge settling plate (10) in the settling zone (4), enters the sludge storage trough (9) from the sludge guiding trough (8), and is eventually discharged by the sludge drainage pump.

Wastewater treatment experiments using this apparatus possessed a daily capacity of 200 tons. During the operation period, the average COD of the inflow was 273 g/m$^3$, the average BOD of the biodegradable portion was 177 g/m$^3$, the average NH$_4$—N was 29.0 g/m$^3$, the total nitrogen (TN) was 31.2 g/m$^3$, and the total phosphorus (TP) was 1.8 g/m$^3$. After 2.5 hours of hydraulic retention time, 94% of COD, 81% of total nitrogen, and 65% of total phosphorus were removed (concrete data in Table 1). The effluent met the water standards of "Pollutant Emission Standards of Urban Wastewater Treatment Plants" (GB18918-2002) Class A.

TABLE 1

Influent and effluent indicators of treated wastewater using this apparatus

| Parameter | Influent | Effluent |
| --- | --- | --- |
| pH | 7.1-7.4 | 7.2-7.6 |
| TCOD (mg/L) | 273 ± 25 | 26 ± 5 |
| SCOD (mg/L) | 73 ± 19 | 21 ± 4 |
| NH$_4$—N (mg/L) | 29 ± 2.6 | 0.7 ± 0.2 |
| NO$_3$—N (mg/L) | 0.5 ± 0.2 | 6.5 ± 1.1 |
| STKN (mg/L) | 24 ± 2.8 | 1.4 ± 0.1 |
| TKN (mg/L) | 28.2 ± 3.7 | 1.8 ± 0.1 |
| TN (mg/L) | 31.2 ± 1.9 | 8.6 ± 1.2 |
| TP (mg/L) | 1.8 ± 0.52 | 0.6 ± 0.1 |
| TSS (mg L) | 144 ± 30 | 4 ± 2 |
| VSS (mg/L) | 118 ± 21 | 3 ± 1 |
| BOD (mg/L) | 177 ± 10 | 9 ± 2 |
| SBOD (mg/L) | 42 ± 7 | 6 ± 1 |

Figure 4:
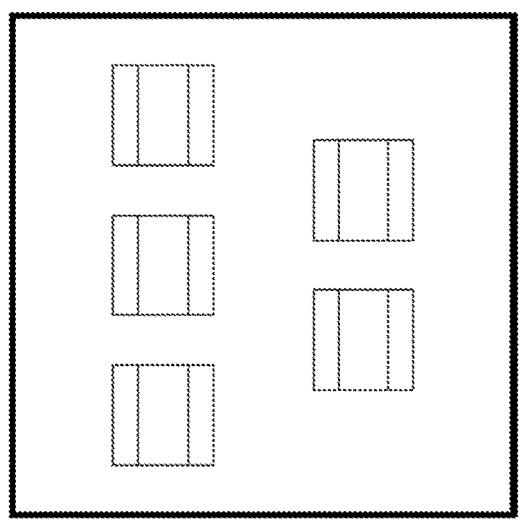
FIG. 4 shows an embodiment of the application of the container-type apparatus for wastewater treatment in polluted rivers or lakes.

In the other embodiment, the container-type apparatus for wastewater treatment is introduced into the wastewater system to effectively treat polluted water in rivers or lakes. Multiple apparatuses are set up in relatively narrow water areas along the river direction. Each apparatus is divided into three zones of anaerobic zone, aerobic zone and anoxic zone. The dimension of length×width×height of container-type wastewater treatment apparatus is 1×1×3 m. These apparatuses are arranged in the river or lake in a symmetrical staggered form, shown in FIG. 4. This arrangement allows most wastewater to be intensively treated through the apparatus and can diminish the impacts on the apparatus by rapid flow.

There are in total six (6) container-type apparatuses in this embodiment. Each biological reaction zone of the apparatus is loaded with solid particles. The solid particles can be light particles or/and heavy particles. Microorganisms can be carried on the surface of solid particles or enriched during the process of wastewater treatment. Solid particles are uniformly dispersed in the biological reaction zones by gas or/and liquid so that microorganisms carried by particles can effectively treat wastewater.

Wastewater treatment is achieved as follows: During the flowing process of the wastewater along the direction of the river, wastewater encounters a series of the presently disclosed container-type apparatuses for wastewater treatment distributed in the river or lake. The water goes through the apparatus by overflow or driving force with water flow in river or electric power. Wastewater enters the apparatus and microorganisms carried by particles in the biological reaction zones treat wastewater effectively. The staggered arrangement of the apparatuses in a river or lake is able to effectively increase the probability of wastewater entering the apparatus, so as to treat the wastewater effectively.

In a non-limiting embodiment, the daily capacity was 1500 tons. During the operation period, the average COD of the inflow was 180 g/m$^3$, the average $NH_4$—N was 36 g/m$^3$, the total nitrogen was 45 g/m$^3$, and the total phosphorus was 1.9 g/m$^3$. After 1.5 hours of hydraulic retention time, 96% of COD, 94% of total nitrogen, and 89% of total phosphorus were removed. The effluent met the water standards of "Surface Water Environmental Quality Standards" (GB3838-2002) Class IV.

Figure 5:
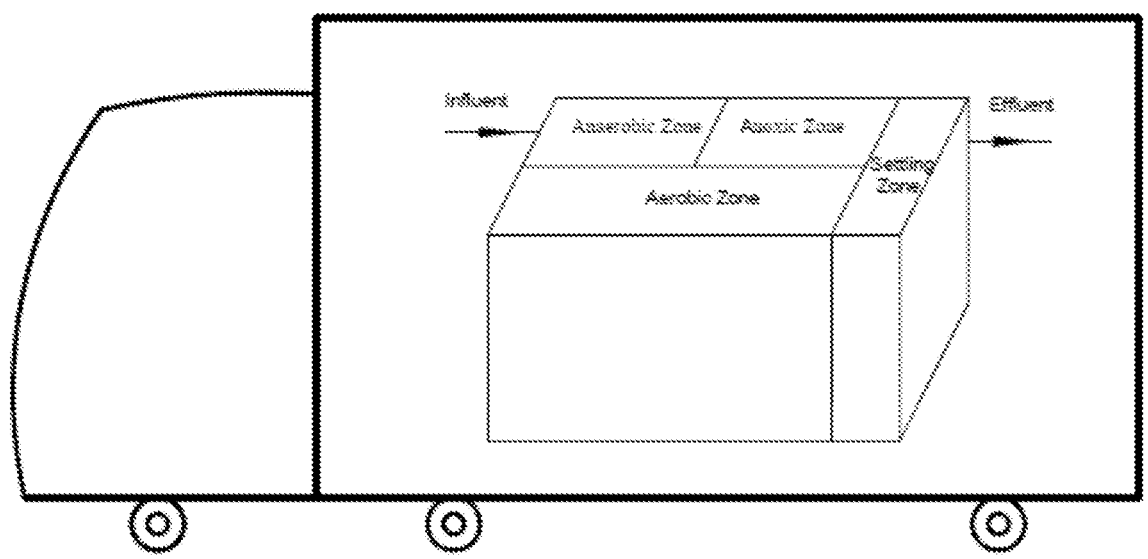
FIG. 5 shows the other one embodiment of the container-type apparatus for wastewater treatment installed in a trailer.

As shown in FIG. 5, in the other embodiment, a container-type wastewater treatment apparatus with the dimension of L×W×H=8.6×2.5×4 m are installed in a trailer with the dimension of L×W×H=8.6×2.5×4 m. Each container-type apparatus is divided into three zones of anaerobic zone, aerobic zone and anoxic zone. Usually, microporous aeration heads and microporous leather tubes are used as the aeration device, while blowers are used to supply gas for biological reaction systems. Liquid distribution in container-type apparatus generally are employed with mechanical wastewater pumps.

Each biological reaction zone is loaded with solid particles. The solid particles can be light particles or/and heavy particles. Microorganisms can be carried on the surface of solid particles or enriched during the process of wastewater treatment. Solid particles are uniformly dispersed in the small systems by gas and liquid so that microorganisms carried by particles can effectively treat wastewater.

For the embodiment, the daily capacity was 120 tons. During the operation period, the average COD of the inflow was 290 g/m$^3$, the average $NH_4$—N was 40 g/m$^3$, the total nitrogen was 48 g/m$^3$, and the total phosphorus was 1.8 g/m$^3$. After 2.1 hours of hydraulic retention time, 95% of COD, 94% of total nitrogen, and 86% of total phosphorus were removed. The effluent met the water standards of "Surface Water Environmental Quality Standards" (GB3838-2002) Class IV.

In conclusion, the present invention provided a container-type apparatus for wastewater treatment with a suspended particle system, comprising one or more biological reaction zones and settling zones. Herein, one or more of the biological reaction zones are suspended particle systems. Particles in this system have large specific surface areas. Applying the system in the process of wastewater treatment can significantly increase the concentration of microorganisms in the system so as to improve the treatment efficiency. Microorganisms are able to attach to the surface of suspended particles to form biofilms. Some microorganisms are heterotrophic bacteria and others are autotrophic bacteria so that groups containing various types of microorganisms are formed. Microorganisms grow and shed on the surface of the suspended particle media and renew continuously. They trigger metabolic degradation reactions with organic pollutants, and/or nitration and denitrification with ammonia and nitrogen, and/or phosphorus release and uptake reactions.

The foregoing description of the preferred embodiments of the invention has been presented to illustrate the principles of the invention and not to limit the invention to the particular embodiments illustrated. Each embodiment is described in a progressive manner. The same or similar sections of each embodiment can be referred to each other and each embodiment emphasizes on the differences from other embodiments. Any minor modifications made to the above embodiments according to the technical substance of the present invention is equivalent to substitution and improvement and shall be included within the scope of the present invention as defined by the appended claims.

Therefore, what is claimed is:

1. A container-type apparatus for wastewater treatment, comprising
   two or more interconnected facultative biological reaction zones, said two or more facultative biological reaction zones including any one or combination of at least one anaerobic zone, and at least one anoxic zone and at least one aerobic zone, each of said facultative biological reaction zones including a fluidized particle system comprised of a combination of light particles and heavy particles, said light and heavy particles having microorganisms located on surfaces thereof, the light particles initially floating on top of the wastewater as a density of said light particles is lower than a density of the wastewater, the heavy particles initially sitting along a bottom of the wastewater as a density of said heavy particles is higher than the density of said wastewater;
   one of the biological reaction zones being including an inlet connected to a source of wastewater; and
   a gas injection mechanism for injecting only gas into enclosures containing said suspended particle system to induce fluidization of said particles in each enclosure, said gas injection mechanism being located near a bottom of said enclosures to inject gas upwardly into said wastewater containing said any one or combination of light particles and heavy particles, and wherein by injecting gas from near the bottom light particles move downward while heavy particles move upward and such that light particles they are fluidized, and the heavy particles are fluidized, and wherein said gas injection mechanism is configured so that the gas flows upwardly in said enclosures continuously or intermittently; and wherein the gas injected upwardly into the wastewater containing the light and heavy particles causes
the light particles to be fluidized by being dispersed downwards and uniformly suspended and distributed in the wastewater and not undergoing directional flow circulation, and
the heavy particles to be fluidized by being dispersed upwards and uniformly suspended and distributed in the wastewater and not undergoing directional flow circulation; and
a container having several of said enclosures contained therein, said container including a wastewater input, said several enclosures contained within said container being interconnected so that wastewater flows into the container and into the several enclosures, wherein both light and heavy particles are present in each of said several enclosures and each enclosure corresponding to a separate biological reaction zone.

2. The container-type apparatus according to claim 1, wherein the light particles are selected to have a density higher than or equal to 80% of the density of said wastewater and lower than the density of said wastewater.

3. The container-type apparatus according to claim 1, wherein the heavy particles are selected to have a density higher than the density of said wastewater and lower than or equal to 120% of the density of said wastewater.

4. The container-type apparatus according to claim 1, wherein said biological reaction zones include at least one of the aerobic zones and at least one anaerobic zone or at least one anoxic zone.

5. The container-type apparatus according to claim 1, wherein said container-type apparatus comprises at least one or any combination of an inflow system, an effluent system, a gas intake system, and a sludge drainage system.

6. The container-type apparatus according to claim 5, wherein when said gas flow intake system is present it is configured for continuous or intermittent gas intake.

7. The container-type apparatus according to claim 1, wherein said container-type apparatus for wastewater treatment comprises said two or more biological reaction zones and at least one settling zone, and wherein the wastewater in said two or more biological reaction zones is connected to the wastewater in said at least one settling zone.

8. The container-type apparatus according to claim 7 wherein said at least one settling zone is configured for wastewater to pass through for producing sludge which is discharged via a sludge drainage system.

9. The container-type apparatus according to claim 1, wherein the biological reaction zone includes screen meshes for preventing the outflow of particles.

10. The container-type apparatus according to claim 1, wherein one or multiple of said container-type apparatus are arranged intensively or separately in polluted rivers or lakes to treat polluted water.

11. The container-type apparatus according to claim 1, wherein one or multiple of said container-type apparatus are arranged near one or more drain outlets along a river bank for treating polluted water before discharging into a river.

12. The container-type apparatus according to claim 1, wherein one or multiple of said container-type apparatus are installed in a trailer for onsite scattered point wastewater treatment.

13. The container-type apparatus according to claim 1, wherein one or multiple of said container-type apparatus are arranged separately or in a group in a wastewater accumulating tank for receiving discharged wastewater from aquaculture ponds to treat the aquaculture wastewater and achieve water treatment and recycling of the treated water.

14. A container-type apparatus for wastewater treatment, comprising
two or more interconnected facultative biological reaction zones, said two or more facultative biological reaction zones including any one or combination of at least one anaerobic zone, and at least one anoxic zone and at least one aerobic zone, each of said facultative biological reaction zones including a fluidized particle system comprised of a combination of light particles and heavy particles, said light and heavy particles having microorganisms located on surfaces thereof, the light particles initially floating on top of the wastewater as a density of said light particles is lower than a density of the wastewater, the heavy particles initially sitting along a bottom of the wastewater as a density of said heavy particles is higher than the density of said wastewater;
one of the biological reaction zones being including an inlet connected to a source of wastewater; and
a gas injection mechanism for injecting only gas into enclosures containing said suspended particle system to induce fluidization of said particles in each enclosure, said gas injection mechanism being located near a bottom of said enclosures to inject gas upwardly into said wastewater containing said any one or combination of light particles and heavy particles, and wherein by injecting gas from near the bottom light particles move downward while heavy particles move upward and such that light particles they are fluidized, and the heavy particles are fluidized, and wherein said gas injection mechanism is configured so that the gas flows upwardly in said enclosures continuously or intermittently; and
wherein the gas injected upwardly into the wastewater containing the light and heavy particles causes
the light particles to be fluidized by being dispersed downwards and uniformly suspended and distributed in the wastewater and not undergoing directional flow circulation, and
the heavy particles to be fluidized by being dispersed upwards and uniformly suspended and distributed in the wastewater and not undergoing directional flow circulation; and
a plurality of box structures with each box structure having perforated walls to allow wastewater to enter an interior of each box structure, wherein both light and heavy particles are present in each of the box structures, and wherein each of the box structures contains one biological reaction zone different than the reaction zones in the other boxes.

15. The container-type apparatus according to claim 14, wherein the light particles are selected to have a density higher than or equal to 80% of the density of said wastewater and lower than the density of said wastewater.

16. The container-type apparatus according to claim 14, wherein the heavy particles are selected to have a density higher than the density of said wastewater and lower than or equal to 120% of the density of said wastewater.

17. The container-type apparatus according to claim 14, wherein said biological reaction zones include at least one of the aerobic zones and at least one anaerobic zone or at least one anoxic zone.

18. The container-type apparatus according to claim 14, wherein said container-type apparatus comprises at least one or any combination of an inflow system, an effluent system, a gas intake system, and a sludge drainage system.

19. The container-type apparatus according to claim 18, wherein when said gas flow intake system is present it is configured for continuous or intermittent gas intake.

20. The container-type apparatus according to claim 14, wherein said container-type apparatus for wastewater treatment comprises said two or more biological reaction zones and at least one settling zone, and wherein the wastewater in said two or more biological reaction zones is connected to the wastewater in said at least one settling zone.

21. The container-type apparatus according to claim 20, wherein said at least one settling zone is configured for wastewater to pass through for producing sludge which is discharged via a sludge drainage system.

22. The container-type apparatus according to claim 14, wherein the biological reaction zone includes screen meshes for preventing the outflow of particles.

23. The container-type apparatus according to claim 14, wherein one or multiple of said container-type apparatus are arranged intensively or separately in polluted rivers or lakes to treat polluted water.

24. The container-type apparatus according to claim 14, wherein one or multiple of said container-type apparatus are arranged near one or more drain outlets along a river bank for treating polluted water before discharging into a river.

25. The container-type apparatus according to claim 14, wherein one or multiple of said container-type apparatus are installed in a trailer for onsite scattered point wastewater treatment.

26. The container-type apparatus according to claim 14, wherein one or multiple of said container-type apparatus are arranged separately or in a group in a wastewater accumulating tank for receiving discharged wastewater from aquaculture ponds to treat the aquaculture wastewater and achieve water treatment and recycling of the treated water.

* * * * *